United States Patent
Hoshino

(10) Patent No.: US 7,872,786 B2
(45) Date of Patent: Jan. 18, 2011

(54) IMAGE DISPLAY APPARATUS, IMAGE DISPLAY METHOD AND PROGRAM

(75) Inventor: Masaru Hoshino, Suwa-shi (JP)

(73) Assignee: Seiko Epson Corporation, Tokyo (JP)

( * ) Notice: Subject to any disclaimer, the term of this patent is extended or adjusted under 35 U.S.C. 154(b) by 893 days.

(21) Appl. No.: 11/751,477

(22) Filed: May 21, 2007

(65) Prior Publication Data

US 2007/0268315 A1    Nov. 22, 2007

(30) Foreign Application Priority Data

May 22, 2006   (JP) .............................. 2006-142157

(51) Int. Cl.
  *G06F 3/12* (2006.01)
  *G06F 15/00* (2006.01)
  *G06F 3/048* (2006.01)
  *H04N 1/46* (2006.01)
  *H04N 1/387* (2006.01)
  *H04N 1/393* (2006.01)
  *G09G 5/00* (2006.01)

(52) U.S. Cl. ..................... 358/540; 358/1.15; 358/1.18; 358/537; 358/538; 358/450; 358/451; 715/783; 715/784; 715/788; 715/789; 715/800; 345/642

(58) Field of Classification Search ........................ None
See application file for complete search history.

(56) References Cited

U.S. PATENT DOCUMENTS

2005/0185158 A1*  8/2005  Matsuhira .................... 355/40

FOREIGN PATENT DOCUMENTS

| JP | 07-036749 | | 2/1995 |
| JP | 07036749 | * | 2/1995 |
| JP | 2001-333269 | | 11/2001 |
| JP | 2004-242093 | | 8/2004 |
| JP | 2004242093 | * | 8/2004 |

* cited by examiner

*Primary Examiner*—Mark K Zimmerman
*Assistant Examiner*—Haris Sabah
(74) *Attorney, Agent, or Firm*—Workman Nydegger

(57) ABSTRACT

The invention provides an image display apparatus that includes a display image creation unit capable of creating a display image that has a plurality of objects superposed on each other; a image display unit capable of displaying the display image created by the display image creation unit on a display; a selection-and-judgment unit capable of receiving selection input from an external source, and based on the selection input, determining which one of the plurality of objects in the display image is selected; and an index information arrangement unit capable of placing an index image at a position different from the position of the display image on the display, wherein the index image visually indicates which of the plurality of objects is determined to be selected by the selection-and-judgment unit, wherein the image display unit displays the index image on the display in addition to the display image.

18 Claims, 10 Drawing Sheets

FIG. 4
140
| ID | IMAGE |
|---|---|
| G01 | a |
| G01 | b |
| ... | ... |
| GM |  90 |
FIG. 5
150
| ID | IMAGE |
|---|---|
| S1 | 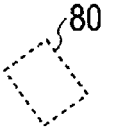 80 |
| S2 | 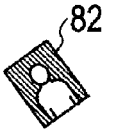 82 |

FIG. 6A  160

| BITMAP |
|---|

FIG. 6B  160

| ID | POSITIONS {(START POINT COORDINATE), (END POINT COORDINATE)} |
|---|---|
| LA (LAYOUT AREA) | { (X1, Y1) , (X2, Y2) } |
| L (LAYOUT) | { (X3, Y3) , (X4, Y4) } |
| M (MOUSE POINTER) | { (X5, Y5) , (X6, Y6) } |
| W01 (IMAGE FRAME 60) | { (X7, Y7) , (X8, Y8) } |
| G01 (LAYOUT IMAGE 70) | { (X9, Y9) , (X10, Y10) } |
| ... | ... |
| S1 (INDEX IMAGE 80) | { (X21, Y21) , (X22, Y22) } |
| S2 (INDEX IMAGE 82) | { (X23, Y23) , (X24, Y24) } |
| GM (THE RECYCLE BIN IMAGE) | { (X25, Y25) , (X26, Y26) } |

FIG. 6C  160

| ID | DISPLAY PRESENT/ABSENT (0: DISPLAY ABSENT, 1: DISPLAY PRESENT) |
|---|---|
| S1 (INDEX IMAGE 80) | 0 |
| S2 (INDEX IMAGE 82) | 1 |

IMAGE DISPLAY APPARATUS, IMAGE DISPLAY METHOD AND PROGRAM

BACKGROUND OF THE INVENTION

The entire disclosure of Japanese Patent Application No. 2006-142157, filed May 22, 2006 is expressly incorporated herein by reference.

1. Technical Field

The present invention generally relates to an image display apparatus, method, and program. In particular, the invention relates to an image display apparatus, method, and program for displaying an image consisting of a plurality of superposed objects on a screen.

2. Related Art

In current display apparatuses, such as the apparatus disclosed in the Japanese Patent Application JP-A-7-36749, there is a problem in successfully identifying the object that is selected by a user when a plurality of objects are displayed on a screen. More specifically, it is difficult to identify, the specific file format of a file selected by a user for deletion when a plurality of files having varying file formats are displayed on a screen.

BRIEF SUMMARY OF THE INVENTION

An advantage of some aspects of the invention is that the invention provides an image display apparatus, an image display method, and an image display program for displaying an image that consists of a plurality of superposed objects on a display.

One aspect of the invention is an image display apparatus that includes: a display image creation section capable of creating a display image that has a plurality of objects superposed on each other; an image display section capable of displaying the display image created by the display image creation section on a display; a selection-and-judgment section capable of receiving selection input from an external source, and based on the selection input, determines which one of the plurality of objects in the display image is selected; and an index information arrangement section capable of placing an index image at a position different from the position of the display image on the display, the index image visually indicating which of the plurality of objects is the object determined to be selected by the selection-and-judgment section, wherein the image display section displays the index image on the display in addition to the display image. With such a configuration, it is possible to visually confirm which of a plurality of objects is selected.

A second aspect of the invention is an image display method that includes: creating a display image that has a plurality of objects superposed on each other or one another; displaying the display image on a display; receiving selection input on the display from an external source, and based on the selection input, determining which one of the plurality of objects in the display image is selected; and placing an index image at a position different from the position of the display image on the display, the index image visually indicating which one of the plurality of objects is the object determined to be selected, wherein the index image is displayed on the display in addition to the display image.

A third aspect of the invention is a program for controlling an image display apparatus so as to direct the image display apparatus to execute a set of procedures comprising the steps of: creating a display image that has a plurality of objects superposed on each other or one another; displaying the display image on a display; receiving selection input from an external source, and based on the selection input, determining which one of the plurality of objects in the display image is selected; and placing an index image at a position different from the position of the display image on the display, the index image visually indicating which of the plurality of objects is the object determined to be selected, wherein the index image is displayed on the display in addition to the display image.

It should be noted that the above summary of the invention does not enumerate all features necessary for the implementation of the invention; rather, any combination of these features may also be used in connection with the invention.

BRIEF DESCRIPTION OF THE DRAWINGS

The invention will be described with reference to the accompanying drawings, wherein like numbers reference like elements.

FIG. 4 illustrates an example of information that is stored in a layout image storage unit.

FIG. 5 illustrates an example of information that is stored in an index image storage unit.

FIG. 6 illustrates an example of information that is stored in a display information memory unit.

DESCRIPTION OF EXEMPLARY EMBODIMENTS

Although the invention is described below while explaining exemplary embodiments thereof, none of the following embodiments are intended to limit the scope of the invention, or to appended its claims, nor is it necessary to encompass all of the combination(s) of features discussed in the embodiments of the invention.

Exemplary Embodiment 1

Figure 1:
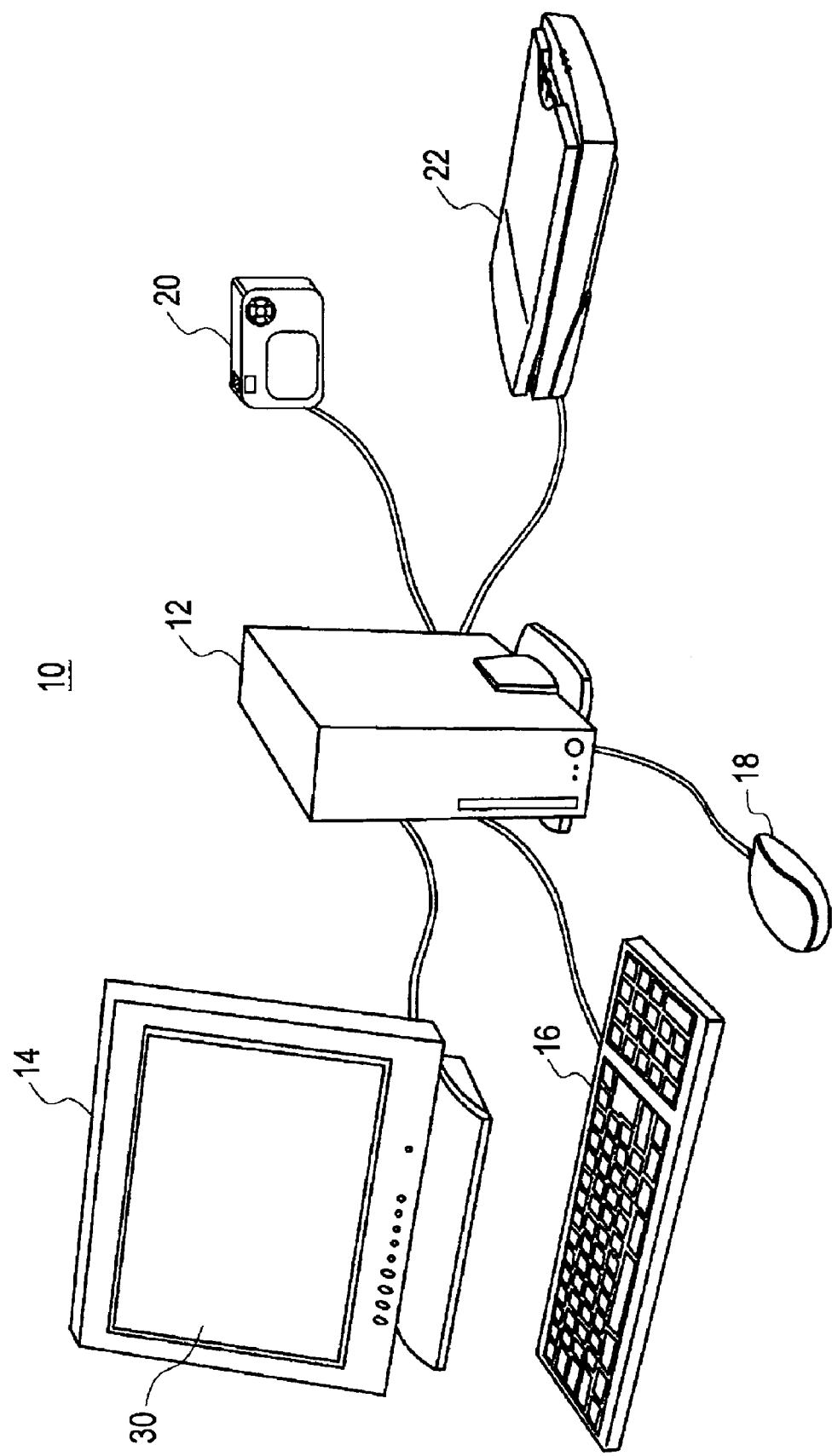
FIG. 1 is a schematic diagram illustrating an example of an image display system.

FIG. 1 is a schematic diagram illustrating an example of an image display system 10. The image display system 10 is provided with a main assembly 12 that executes a program for controlling the image display system 10, a display 14 that has a display screen 30 which provides a display to a user based on output from the main assembly 12, and a keyboard 16 and a mouse 18, which are each examples of user input devices that are capable of interfacing with the main assembly 12. A digital camera 20 and a scanner 22, are shown as examples of means of scanning an image and are connected to the main assembly 12.

Figure 2:
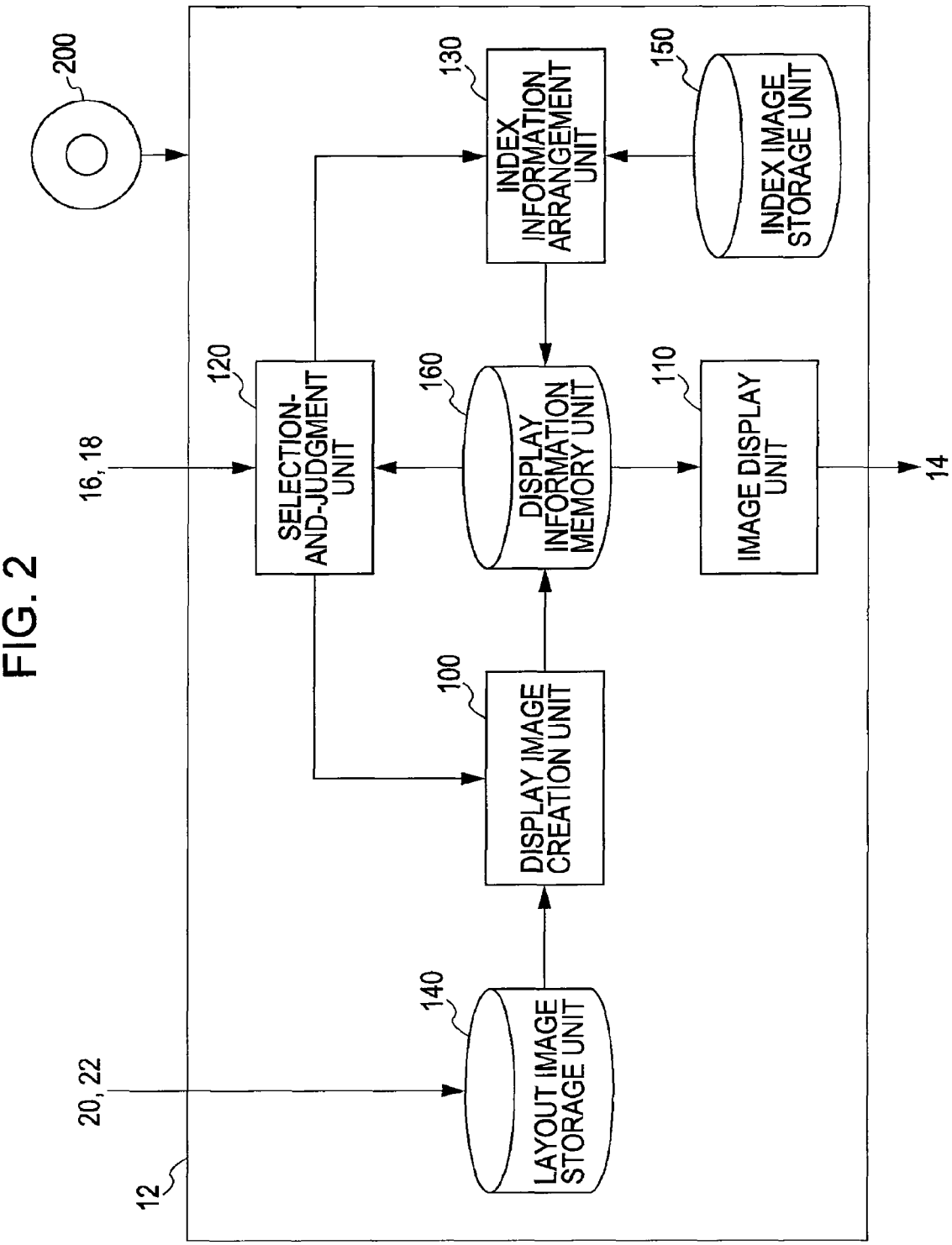
FIG. 2 is a block diagram illustrating an example of a image display system.
Figure 3:
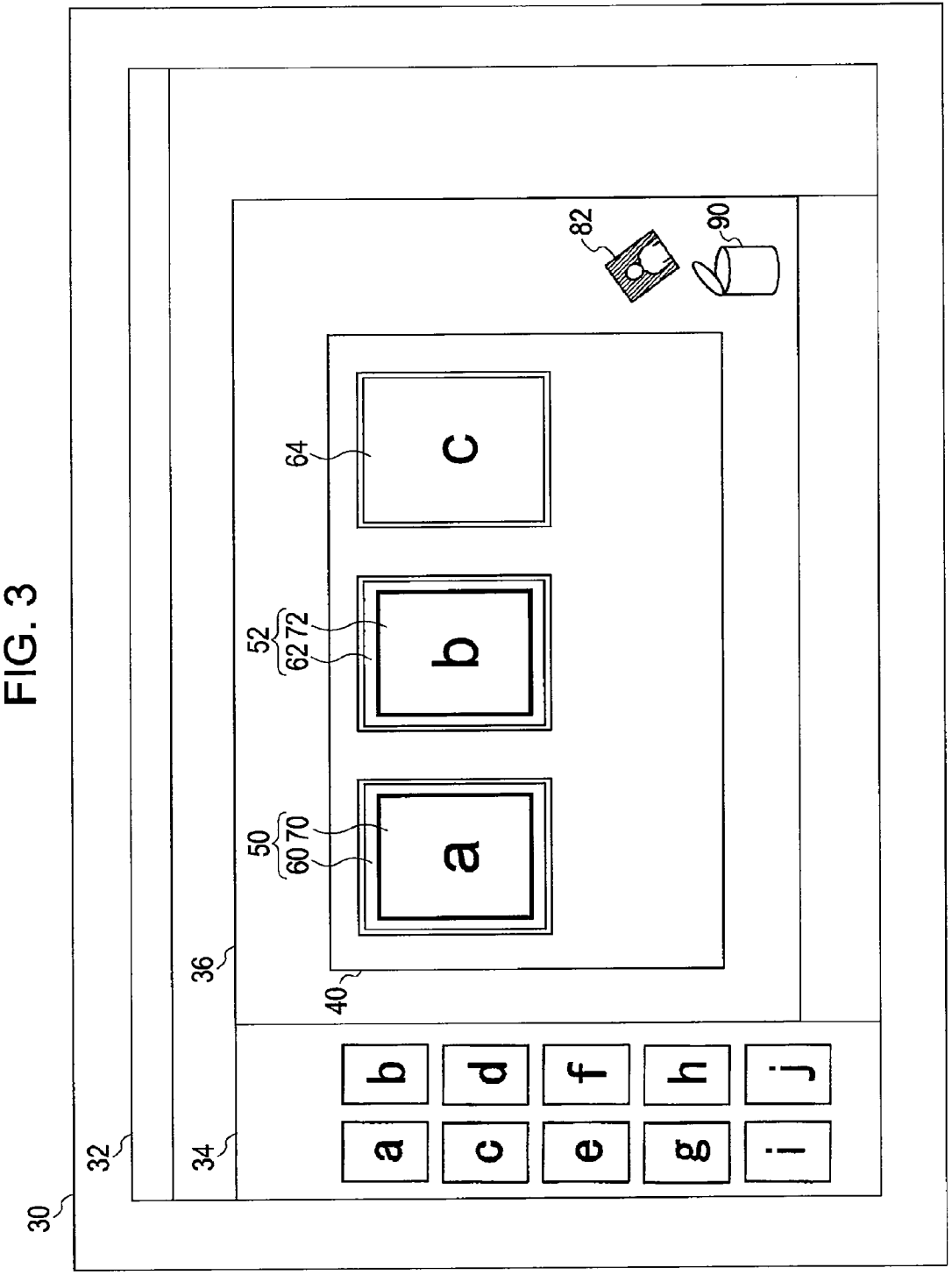
FIG. 3 is a schematic diagram that illustrates an example of a window display.

FIG. 2 is a block diagram illustrating an example of the image display system 10. FIG. 3 schematically illustrates an example of a window display 32. FIG. 4 illustrates an exemplary information that may be stored in a layout image storage unit 140. FIG. 5 illustrates exemplary information that may be stored in an index image storage unit 150. FIG. 6 illustrates exemplary information that may be stored in a display information memory unit 160.

As illustrated in FIG. 2, the main assembly 12 has a display image creation unit 100, an image display unit 110, a selection-and-judgment unit 120, an index information arrangement unit 130, a layout image storage unit 140, an index image storage unit 150, and a display information memory unit 160. A program capable of operating the display image creation unit 100, image display unit 110, selection-and-judgment unit 120, index information arrangement unit 130, layout image storage unit 140, index image storage unit 150, and display information memory unit 160 is stored in a storage medium 200. Alternatively, it is possible to install the above program in the storage medium 200 on the main assembly 12. As another alternative, the main assembly may operate the program via communication lines.

As illustrated in FIG. 3, the image display unit 110 displays a window 32 including a graphic user interface capable of performing image processing on the display screen 30. The window display 32 includes a browser area 34 for displaying thumbnail images and a layout area 36 for accepting input for creation of a layout 40.

The image display unit 110 displays a plurality of objects that are positioned in the layout 40. In the example shown in FIG. 3, the image display unit 110 displays a plurality of frames 60, 62, and 64 and layout images 70 and 72 that may be placed inside the image frames 60 and 62, respectively. The image display unit 110 further displays a Recycle Bin image 90 which serves as a visual representation of the deletion of objects and an index image 82, which will be explained more fully below. In this example, the image display unit 110 is an image that consists of a plurality of objects superposed on one another. In the example shown in the FIG. 3, the image display unit 110 includes a display image 50 comprised of the layout image 70 superposed on the image frame 60 and a display image 52 comprised of the layout image 72 superposed on the image frame 62 and the layout image 72. Note that the image display unit 110 continually displays the display images 50, 52, etc., meaning that it is displayed even when the Recycle Bin image 90 or the index image 82 is displayed.

FIG. 4 illustrates the layout image storage unit 140 which is capable of storing images acquired from the digital camera 20, scanner 22 (shown in FIG. 1), and so on and associating each of these images with corresponding identification information (hereafter referred to as "ID"). The layout image storage unit 140 is further capable of storing the image of the Recycle Bin 90, which is displayed in the layout area 36. The image(s) stored in the layout image storage unit 140 are displayed in the browse area 34 when selected by a user through an input device.

FIG. 5 illustrates the index image storage unit 150 which is capable of storing the index image 80, which is used to visually represent the selection of any of the image frames 60, 62, and 64, and the index image 82, which visually represent the selection of either of the layout images 70 and 72. The index image storage unity 150 is further capable of associating the index images to corresponding IDs. In the example shown in FIG. 5, the index image storage unit 150 stores an image of a rectangle shown in broken line with no picture inside as the index image 80, which visually represents that no selection of any of the image frames 60, 62, and 64 has been made. In comparison, the index image storage unit 150 includes an image of a rectangle with a portrait picture as the index image 82, which visually represents the selection of either of the layout images 70 and 72.

FIG. 6A illustrates the display information memory unit 160 which is capable of storing a bitmap that is displayed by the image display unit 110. As illustrated in FIG. 6B, the display information memory unit 160 stores the display positions of the layout area 36, the layout 40, a mouse pointer, the image frames 60, 62, and 64, the layout images 70 and 72, the index images 80 and 82, the Recycle Bin image 90, etc., contained in the bitmap and associates these positions with corresponding IDs. As further illustrated in FIG. 6C, the display information memory unit 160 stores present/absent flags pertaining to presence or absence of display while associating the respective flags with the IDs used for identifying the index images 80 and 82. More specifically, according to the examples used in FIG. 3, the display information memory unit 160 stores a display present/absent flag "0", in order to indicate that the image identified by the ID "S1" is not displayed, and associates the flag 0 with the ID S1, while storing a display present/absent flag "1" in order to indicate that the image identified by the ID "S2" is displayed, and associating this flag 1 with the ID S2. It should be noted that the display information memory unit 160 may pre-store the display positions of the index images 80 and 82 as well as that of the Recycle Bin image 90. In such instances, it is preferable that the display information memory unit 160 set the display positions of the index images 80 and 82 in the near the Recycle Bin image 90. This way it is possible to prevent any inadvertently selected objects from being mistakenly deleted.

The selection-and-judgment unit 120 is capable of accepting user manipulation on the display screen 30. More specifically, the selection-and-judgment unit 120 is capable of receiving selection input, or information relating to the movement of the mouse 18 and interaction with the mouse button from an external mouse information source. Herein, the information relating to the movement of the mouse 18 includes information about the direction and the vector quantity of the movement, while the information about the interaction with the mouse button includes information on the clicking along with identifying information for identifying which button was clicked. For example, when a user moves the mouse 18, the selection-and-judgment unit 120 receives a notification of the mouse movement including information on the direction and the vector quantity of the movement; and when a user clicks the mouse 18, the selection-and-judgment unit 120 receives a notification of the mouse click.

In addition, the selection-and-judgment unit 120 is capable of determining which one of the plurality of objects in the display images 50 and 52 has been selected, based on the user manipulation on the display screen 30. For example, upon reception of a notification of clicking, the selection-and-judgment unit 120 acquires the coordinate of the clicking based on the coordinates of the mouse pointer stored in the display information memory unit 160. Then, the selection-and-judgment unit 120 determines which one of the components of the display image, either the image frames 60, 62, and 64 or the layout images 70 and 72, was selected based on the acquired coordinate and the coordinates of the image frames 60, 62, and 64 and the layout images 70 and 72 stored in the display information memory unit 160.

The display image creation unit 100 creates a bitmap of the window display 32 using the process described above. The creation process is initiated by a program-initiation unit (not shown). The display image creation unit 100 is also capable of creating a bitmap of the window display 32 based on the information acquired from the selection-and-judgment unit 120. For example, on the basis of mouse information acquired from the selection-and-judgment unit 120, the display image creation unit 100 creates the display images 50 and 52, by laying out the plurality of thumbnail images of the layout images 70 and 72, in the image frames 60 and 62 in the browse area 34. The display image creation unit 100 is further capable of creating a bitmap containing the display images 50 and 52.

The index information arrangement unit 130 places the index image 80 at a position different from the positions of the display images 50 and 52 within the display screen 30 if the selected object is judged by the selection-and-judgment unit 120 to be any of the image frames 60, 62, and 64. In contrast, the index information arrangement unit 130 places the index image 82 at a position different from the positions of the display images 50 and 52 on the display screen 30 if the selected object is either of the layout images 70 and 72.

Figure 7:
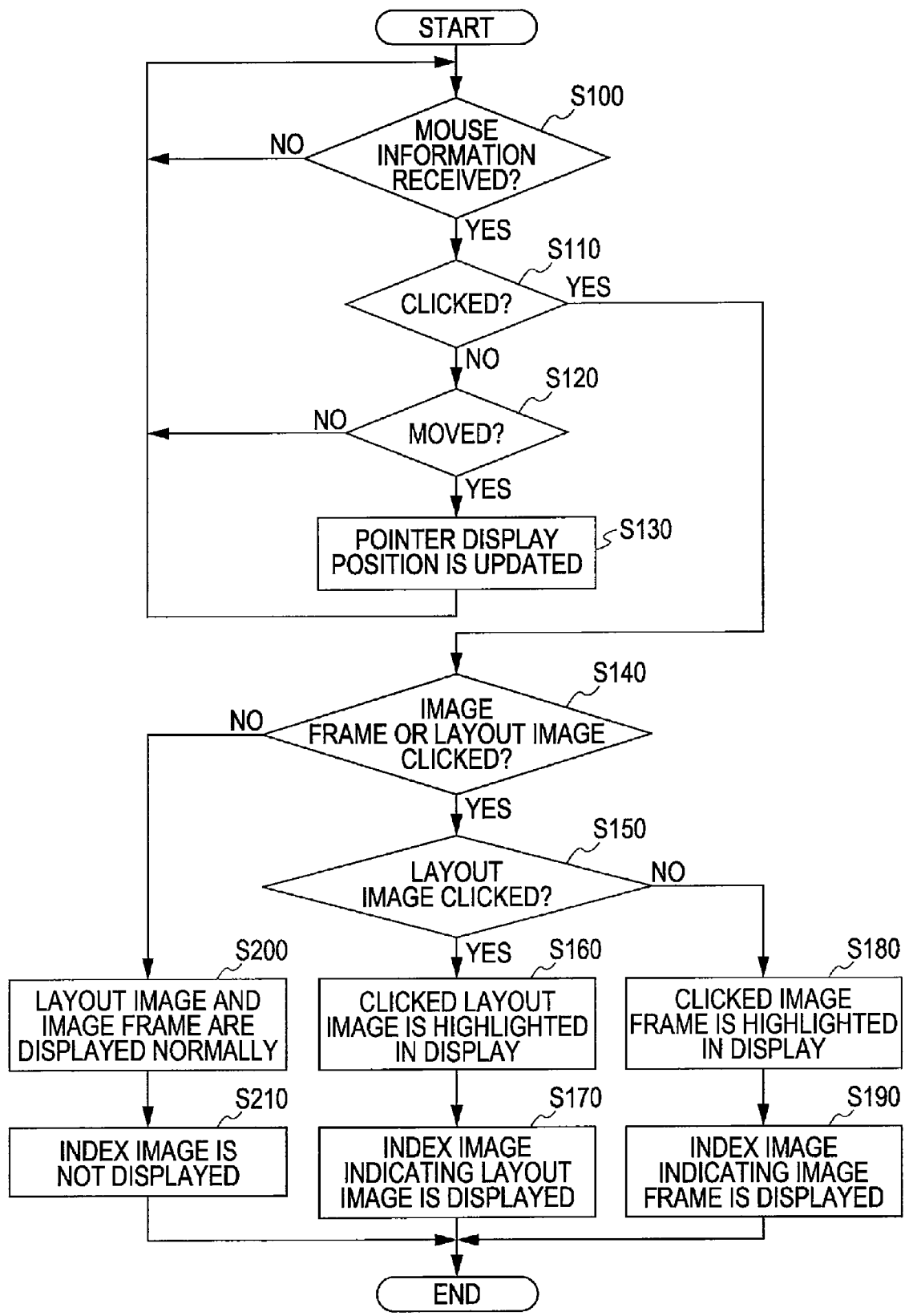
FIG. 7 is a flowchart illustrating an example of the operation of the image display system.
Figure 8:
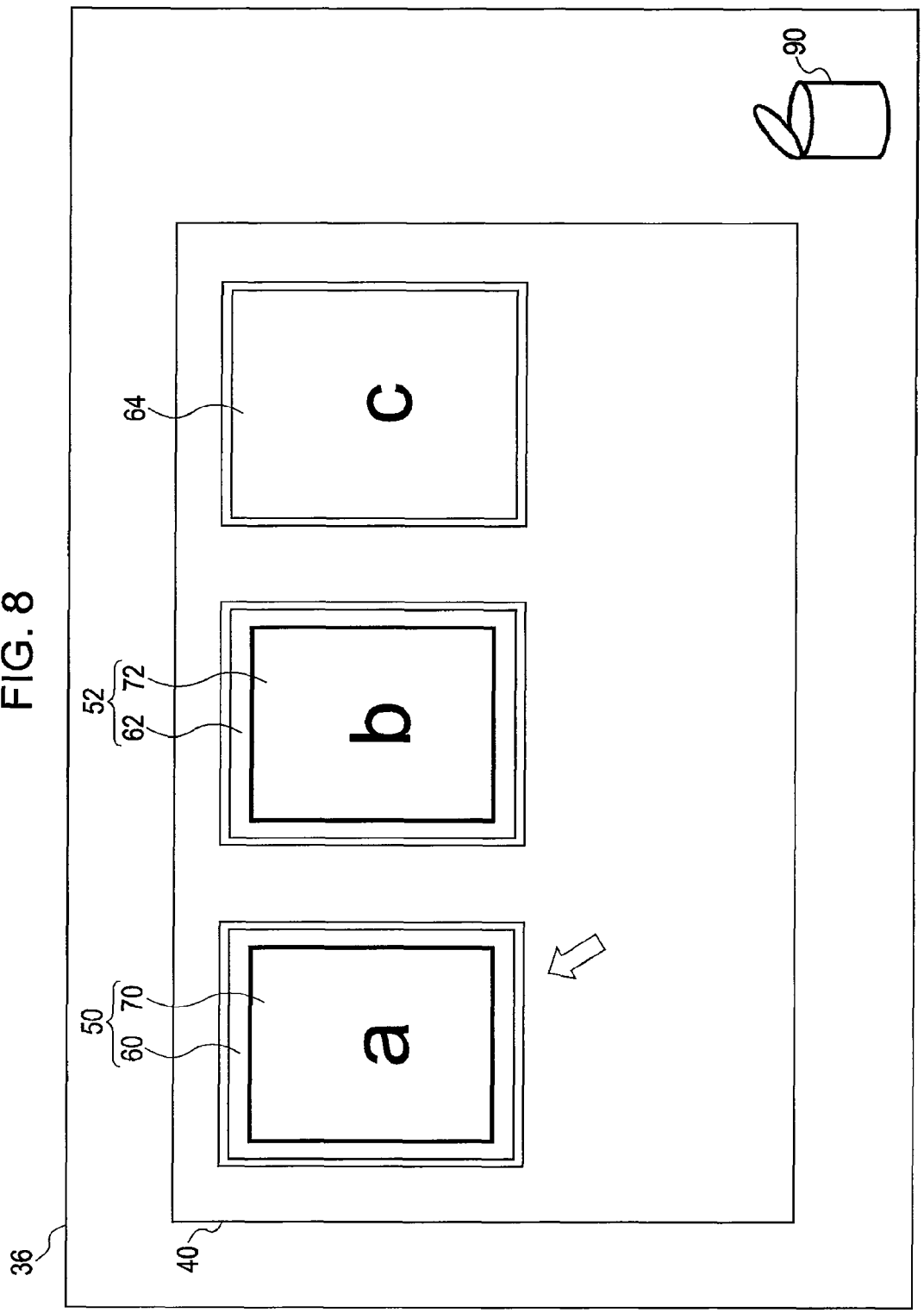
FIG. 8 is a schematic diagram that illustrates a display example of a layout area.
Figure 9:
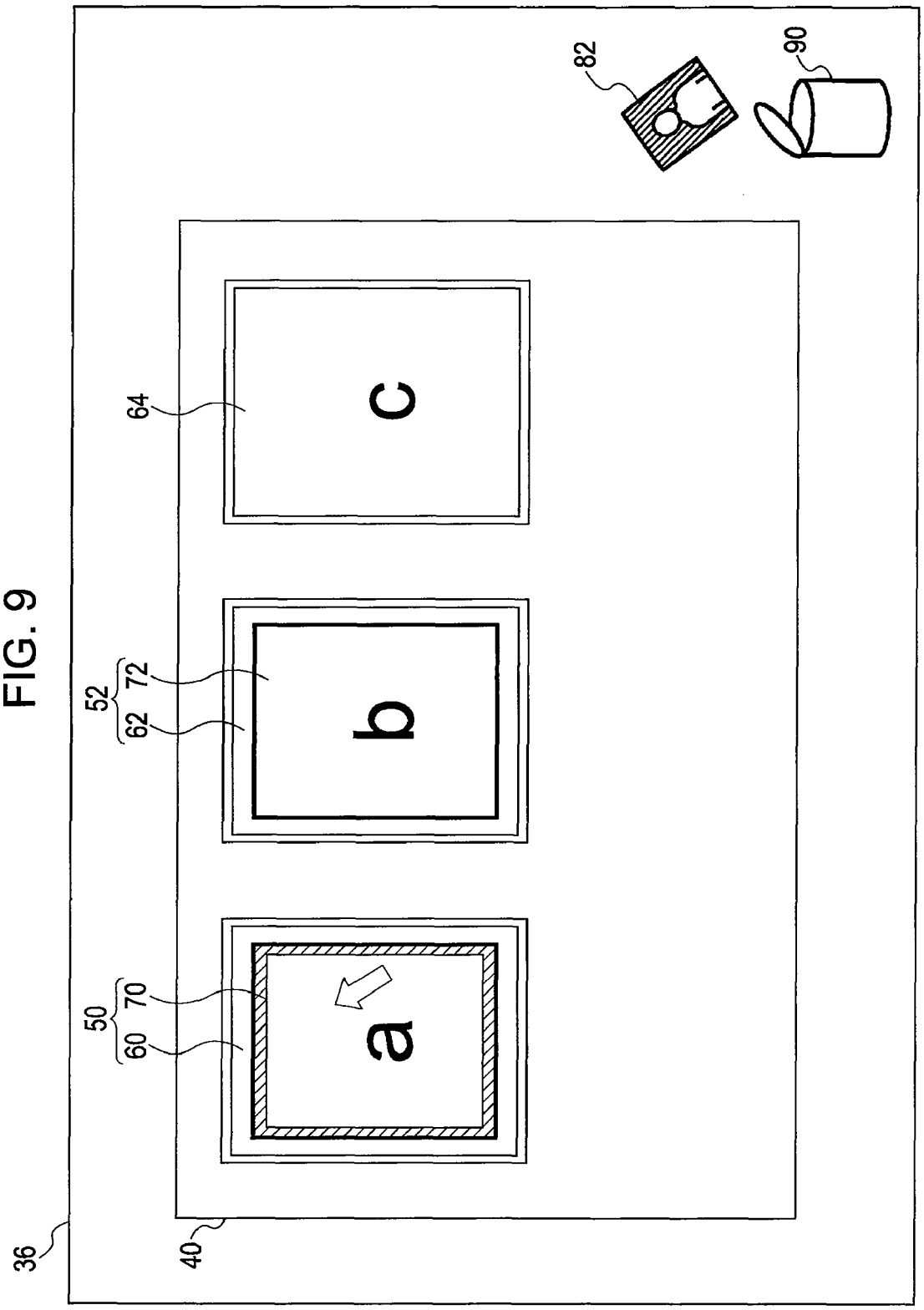
FIG. 9 is a schematic diagram that illustrates a display example of the layout area of FIG. 8.
Figure 10:
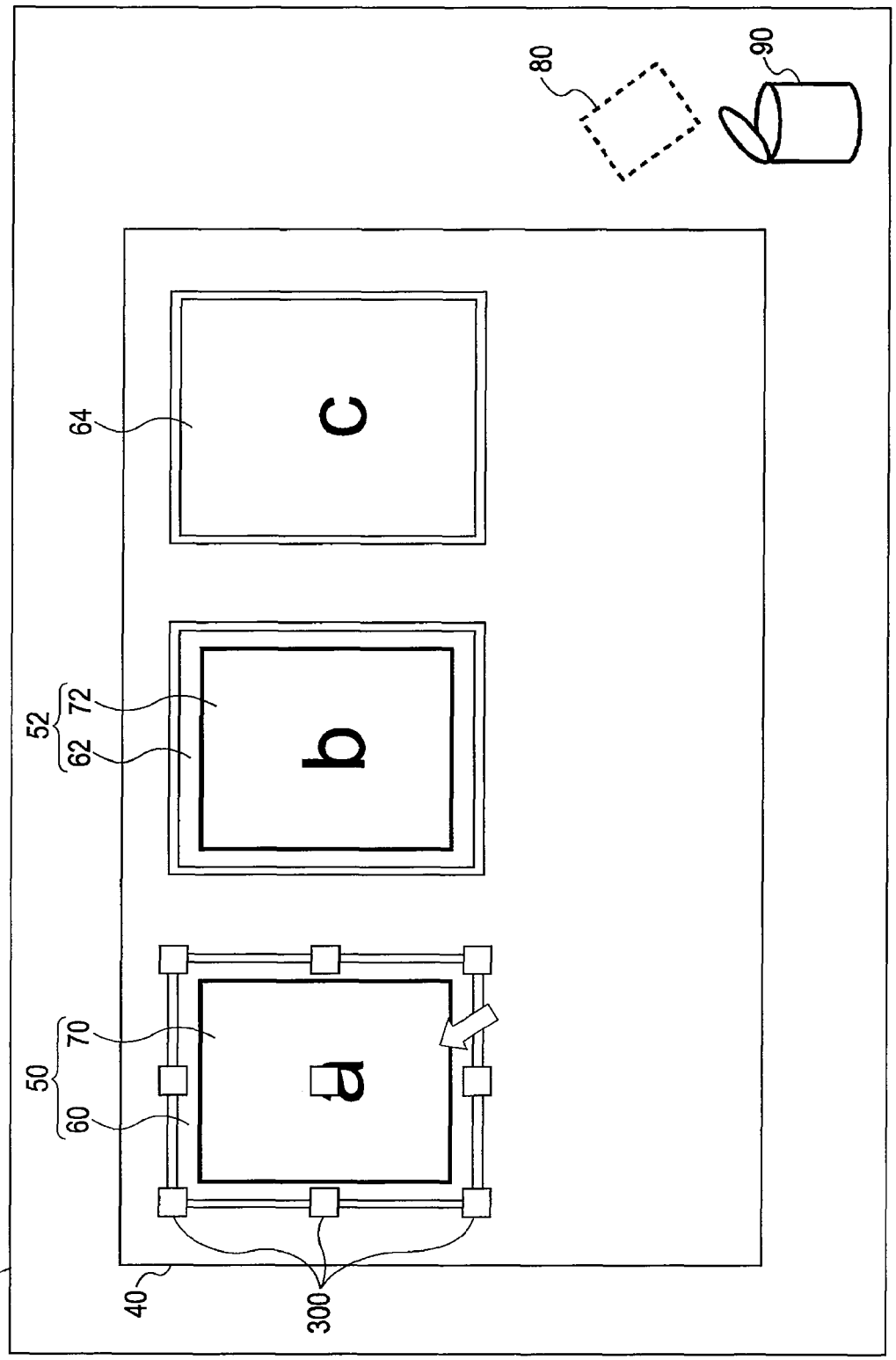
FIG. 10 is a schematic diagram that illustrates a display example of the layout area of FIG. 8.
Figure 11:
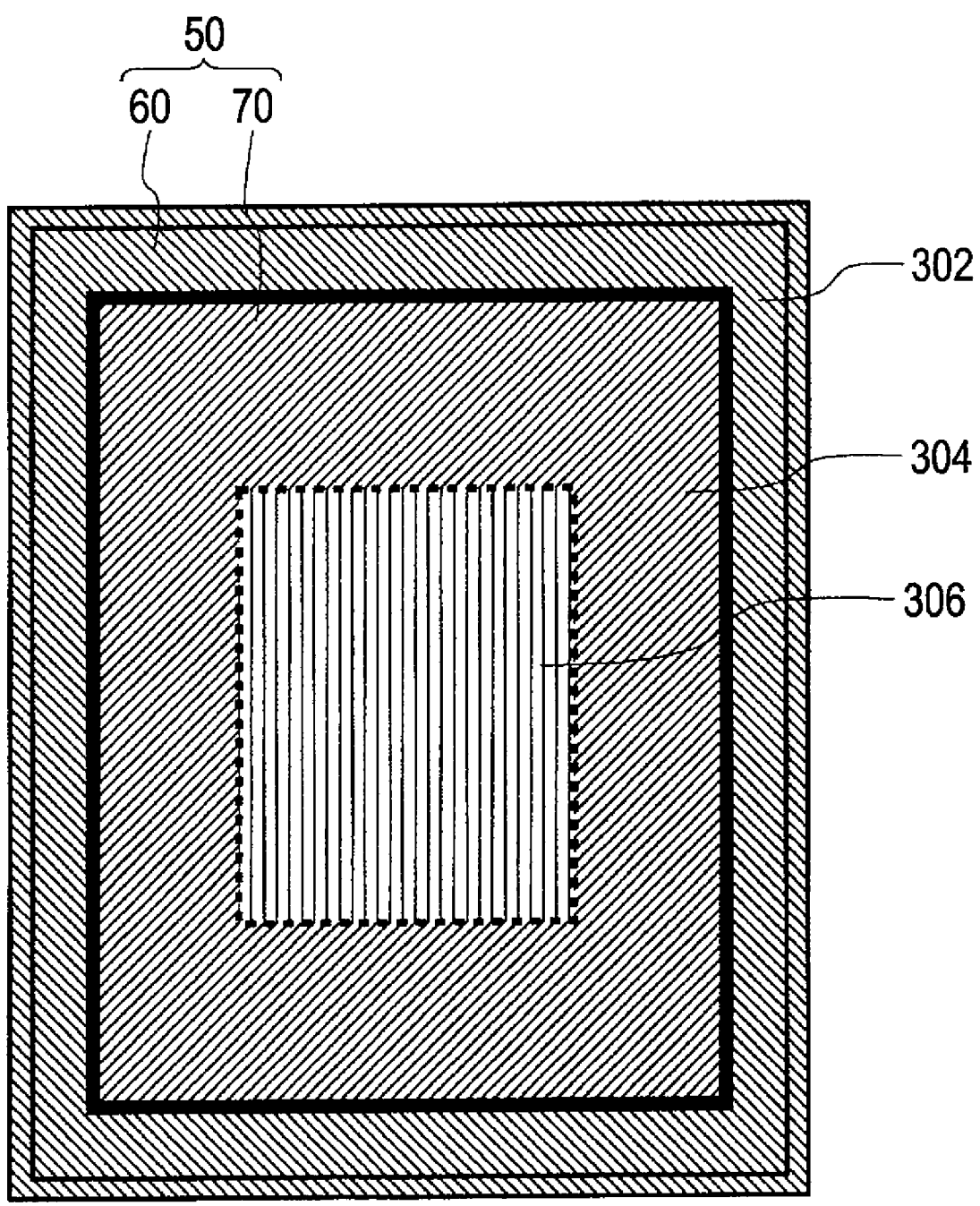
FIG. 11 is a schematic diagram that shows a display image in an enlarged view.

FIG. 7 is a flowchart illustrating the operation of the image display system 10. FIGS. 8-10 schematically illustrate examples of displays of the layout area 36. FIG. 11 is a schematic diagram that shows the display image 50 in an enlarged view.

Returning to FIG. 7, it is assumed at the starting point that the display of the layout area 36 is as illustrated in FIG. 8, and that the display information memory unit 160 includes stored preset information relating to the display positions of the index images 80 and 82 as well as that of the Recycle Bin image 90. In addition thereto, it is further assumed that the display information memory unit 160 preset information relating to the display portions of the index images 80, 82 comprise display present/absent flag "0" in association with IDs "S1" and "S2" for identification of the index images 80 and 82.

The selection-and-judgment unit 120 waits in a standby state until it receives any mouse information from an external source. At step S100, when the selection-and-judgment unit 120 receives any mouse information from an external source. Next, at step S110, it determines whether the received mouse information is a notification of mouse click action or not.

If at step S110, the selection-and-judgment unit 120 judges that the received mouse information is not a notification of mouse click action, it then moves to step 120 and determines whether the received mouse information is a notification of mouse movement or not.

If at step S120, if the selection-and-judgment unit 120 judges that the received mouse information is a notification of mouse movement, it then proceeds to step S130 and notifies the display image creation unit 100 of the direction and the vector quantity of the movement. Based on this information together with the current position of the mouse pointer stored in the display information memory unit 160, the display image creation unit 100 then updates the position of the mouse pointer memorized in the display information memory unit 160 by replacing the position before the move by the position after the move, and creates a new bitmap at step S130. Thereafter, the image display unit 110 performs display based on the new bitmap stored in the display information memory unit 160.

If at step S120, the selection-and-judgment unit 120 judges that the received mouse information is not a notification of mouse move action, the process returns to the step S100. Note that the selection-and-judgment unit 120 judges that the received mouse information is not a notification of mouse click action nor a notification of mouse move action when the information is associated with tilt wheel manipulation and so forth.

If at step S110, the selection-and-judgment unit 120 determines that the received mouse information is a notification of mouse click, it proceeds to step S140 and determines whether any one of the image frames 60, 62, 64 and the layout images 70 or 72 was clicked. More specifically, the selection-and-judgment unit 120 acquires the clicked position in the layout area 36 by referring to the position of the mouse pointer stored in the display information memory unit 160. Then, referring to the position of the image frame 60, 62, 64 stored in the display information memory unit 160, the selection-and-judgment unit 120 determines if the image frame 60, 62, 64 or the layout image 70 or 72 was clicked if the clicked position is inside the display position of the image frame 60, 62, 64.

At step S140, if the selection-and-judgment unit 120 determines whether the image frame 60, 62, 64 or the layout image 70 or 72 was clicked, then the process continues to step S150 where the selection-and-judgment unit 120 further determines whether the layout image 70 or 72 was clicked. More specifically, referring to the coordinates of the layout image 70, 72 stored in the display information memory unit 160, the selection-and-judgment unit 120 determines whether the layout image 70 or 72 was clicked by determining if the clicked position is inside the display position of the layout image 70 or 72.

If at step S150 the selection-and-judgment unit 120 determines that the layout image 70 or 72 was clicked, it notifies the display image creation unit 100 that the layout image 70 or 72 was clicked. Then, the display image creation unit 100 superposes an image that visually represents the selection of the layout image 70 or 72 on the clicked layout image 70 or 72 so as to arrange the superposed set of images. More specifically, upon reception of a notification that the layout image 70 was clicked, the display image creation unit 100 creates a new bitmap while superposing an image that visually shows that the layout image 70 is selected on top of the clicked layout image 70. Then at step S160, the image display unit 110 generates a display based on the new bitmap stored in the display information memory unit 160, such as the bitmap shown in FIG. 9. It should be noted that, in the example shown in FIG. 9, the display image creation unit 100 displays an outer frame with oblique lines around the layout image 70 in order to visually indicates that the layout image 70 has been selected. By this means, it is possible to confirm that the layout image 70 is selected between the layout image 70 and the image frame 60.

If at step S150 the selection-and-judgment unit 120 determines that the layout image 70 or 72 was clicked, it notifies to the index information arrangement unit 130 that the layout image 70 or 72 was clicked. The index information arrangement unit 130 changes the display present/absent flag "0" stored in association with an ID "S2" for identification of the index image 82 to the display present/absent flag "1". In addition, the index information arrangement unit 130 creates a new bitmap with the index image 82 placed at a predetermined position. Then at step S170, the image display unit 110 displays a index image 82 based on the bitmap stored in the display information memory unit 160, such as the index image shown in FIG. 9, and the process ends.

By this means, it is possible to confirm that the layout image 70 is selected between the layout image 70 and the image frame 60 by using an index display placed at a position different from that of the selected image. It should be noted that the index information arrangement unit 130 changes the stored display present/absent flag "1" into "0" if the flag in memory is "1" while associating it with an ID "S1" for identification of the index image 80.

If at step S150 the selection-and-judgment unit 120 determines that the layout image 70 or 72 was not clicked, that is, if the selection-and-judgment unit 120 determines that the image frame 60, 62, 64 was clicked, it notifies to the display image creation unit 100 that the image frame 60, 62, 64 was clicked. In response to this notification, the display image creation unit 100 superposes an image that visually indicates the selection of the image frame 60, 62, or 64 so as to arrange the superposed set of images. More specifically, upon reception of a notification that the image frame 60 was clicked, the display image creation unit 100 creates a new bitmap while superposing an image that visually indicates that the image frame 60 was selected, by superimposing the image onto the clicked image frame 60. Thereafter, at step S180, the image display unit 110 generates a display based on the new bitmap stored in the display information memory unit 160, such as the superimposed image shown in FIG. 10. In the example shown in FIG. 10, the display image creation unit 100 displays selection marks 300 both at the center point and several outer corner/edge points of the image frame 60 in order to visually indicate that the image frame 60 has been selected. By this means, it is possible to confirm that the image frame 60 was selected between the layout image 70 and the image frame 60.

Next, the index information arrangement unit 130 changes the display present/absent flag "0" stored in association with an ID "S1" for identification of the index image 80 into the display present/absent flag "1". In addition, the index information arrangement unit 130 creates a new bitmap with the index image 80 and places it at a predetermined position. At step S190, the image display unit 110 displays the index image 80 based on the bitmap stored in the display information memory unit 160, such as the index image shown in FIG. 10, and the process ends. Using this process, it is possible to confirm that the image frame 60 was selected between the layout image 70 and the image frame 60, by using an index display placed at a position different from that of the selected image.

As previously explained, it should be noted that the index information arrangement unit 130 changes the display present/absent flag "1" memorized in association with an ID "S2" for identification of the index image 82, if so memorized, into the display present/absent flag "0".

If at step S140, the selection-and-judgment unit 120 determines that neither the image frames 60, 62, and 64 nor the layout images 70 and 72 were clicked, then it notifies the display image creation unit 100 that none of the image frames 60, 62, and 64 or the layout images 70 and 72 were clicked. Next, the display image creation unit 100 removes the image used to visually indicate that the image frame 60, 62, or 64 was selected along with the image for visually showing that the layout image 70, 72 was selected. At step S200, the image display unit 110 generates a display based on the new bitmap stored in the display information memory unit 160, such as the display shown in FIG. 8, and the process ends.

In addition, the selection-and-judgment unit 120 notifies to the index information arrangement unit 130 that neither the image frames 60, 62, and 64 nor the layout images 70 or 72 were clicked. When the display present/absent flag memorized in association with the ID "S1" for identification of the index image 80 is "1", the index information arrangement unit 130 changes the display present/absent flag "1" into "0", whereas when the display present/absent flag memorized in association with the ID "S2" for identification of the index image 82 is "1", the index information arrangement unit 130 changes the display present/absent flag "1" into "0". Moreover, the index information arrangement unit 130 creates a new bitmap which excludes the index image 80, 82.

When the selection-and-judgment unit 120 recognizes that the mouse 18 was clicked at the position of the index image 80 or the Recycle Bin image 90, and the display present/absent flag "1" is stored in association with the ID "S1" for identification of the index images 80, it is preferable that the image display unit 110 should display a bitmap without the selected image frame 60 and the layout image 70, and should change the display present/absent flag associated with the ID "S1" into "0". When the selection-and-judgment unit 120 recognizes that the mouse 18 was clicked at the index image 82 or the Recycle Bin image 90, and the display present/absent flag "1" is stored in association with the ID "S2" for identification of the index images 82, it is preferable that the image display unit 110 should display a bitmap without the selected layout image 70, and should change the display present/absent flag associated with the ID "S2" into "0".

At step S170, although the index information arrangement unit 130 creates a new bitmap including the index information 82, the image display unit 110 may be used to create the bitmap. The same may be true for the step S200.

In addition to the information illustrated in FIG. 6, the display information memory unit 160 may further store information indicating which superposed image frame and superposed layout image is selected in association with areas on an display image. For example, as illustrated in FIG. 11, the display information memory unit 160 may store information indicating that the image frame 60 is selected by using a selection area 302, which is positioned inside the image frame 60 but outside the layout image 70. Thus, the display information memory unit 160 may store information indicating that the image frame 60 is selected in association with a selection area 304, which is an outer area positioned inside the layout image 70, or the display information memory unit 160 may store information indicating that the layout image 70 is selected in association with a selection decision area 306, which is an area positioned inside the layout image 70. In such a scenario, at step S150, the selection-and-judgment unit 120 determines whether the image frame 60 was selected or the layout image 70 was selected by referring to the above information stored in the display information memory unit 160. By this means, it is possible to easily select the image frame 60, even when the selection area 302 is small.

Thus, one aspect of the present invention is the ability to visually confirm that the selected object is the image frame 60, 62 or the layout image 70, 72. Although the embodiment above describes a scenario wherein the selection-and-judgment unit 120 determines the selection based on the display positions, it should be noted that the invention is in no case limited to such a specific implementation.

As an example, in addition to, or in place of, determinations based on the display position, the selection-and-judgment unit 120 may select the image frame 60 or the layout image 70 alternately each time the display image 50 is clicked. In such a variation, the display information memory unit 160 may store the image frame and the layout image's relation to each other in addition to coordinates thereof, along with information indicating whether the image frame or the layout image is currently selected. Upon receiving a notification of a clicking action, the selection-and-judgment 120 may switch the "currently selected" status of the image frame or the layout image.

In another similar variation, the selection-and-judgment unit 120 may select the image frame 60 or the layout image 70 alternately each time the index image 80, 82 is clicked based on the image frame 60 or the layout image 70 of the display image that has been previously selected.

Although the present invention is described explaining the exemplary embodiments thereof, the technical scope of the invention is in no case limited to the explicit and implicit description of the above embodiments of the invention. It is clear and obvious to a person skilled in the art that the above embodiments of the invention may be subjected to various alterations, adaptations, modifications, or improvements. From the recitation of the appended claims, it is clear and obvious that such an altered, adapted, modified, or improved mode is also encompassed by the technical scope of the invention.

What is claimed is:

1. An image display apparatus comprising:
   a display image creation section capable of creating a display image that has a plurality of objects superposed on each other such that first group of the plurality of objects is superposed on a second group of the plurality of objects;
   an image display section capable of displaying the display image created by the display image creation section at a position within a display;
   a selection-and-judgment section capable of receiving selection input from an external source, and using the input to determine which one of the plurality of objects in the display image is selected and whether the selected object is in the first group of the plurality of objects which is superimposed on an object of the second group of the plurality of the second group of objects or whether the selected object is in the second group of the plurality of the objects; and
   an index information arrangement section capable of placing a first or second index image at a position different from the position of the display image on the display, the first or second index image visually indicating which of the plurality of objects is the object determined to be selected by the selection-and-judgment section by placing the first index image at the position different from the position of the display image when the selection-and-judgment section determines that an object of the first group of objects is selected and by placing the second index image at the position different from the position of the display image when the selection-and-judgment section determines that a object of the first group of objects is selected,
   wherein the image display section displays the first or second index image on the display in addition to the display image.

2. The image display apparatus according to claim 1, wherein the display image creation section places a Recycle Bin image visually indicating the deletion of the object at a position different from the position of the display image on the display, whereas the index information arrangement section places the index image near the Recycle Bin image on the display.

3. The image display apparatus according to claim 1, wherein the selection-and-judgment section determines which one of the plurality of objects is selected based on the position of the display image at the time of reception of the selection input.

4. The image display apparatus according to claim 1, wherein the selection-and-judgment section is further capable of receiving repeated selection input from an external source in the position of a single display image and determining that the selected object is an object superimposed on the display image.

5. The image display apparatus according to claim 1, wherein the display image creation section superposes an image that visually indicates which one of the plurality of objects is the object determined to be selected by the selection- and-judgment section on top of the display image.

6. The image display apparatus according to claim 1, wherein the plurality of objects include a frame in which an image is placed and a layout image that is placed within the frame.

7. An image display method comprising:
   creating a display image that has a plurality of objects superposed on each other, such that first group of the plurality of objects is superposed on a second group of the plurality of objects;
   displaying the display image at a position within a display;
   receiving selection input from an external source, and based on the selection input, determining which one of the plurality of objects in the display image is selected and whether the selected object is in the first group of the plurality of objects which is superimposed on an object of the second group of the plurality of the second group of objects or whether the selected object is in the second group of the plurality of the objects; and
   placing a first index image at the position different from a position of the display image on the screen when the selection-and-judgment section determines that an object of the first group of objects is selected;
   placing the second index image at the position different from the position of the display image when the selection-and-judgment section determines that a object of the first group of objects is selected,
   wherein the image display section displays the first or second index image on the display in addition to the display image.

8. The image display method according to claim 7, further comprising displaying a Recycle Bin image visually indicating the deletion of the object at a position different from the position of the display image on the display, at a position near the index image.

9. The image display method according to claim 7, wherein determining which one of the plurality of objects is selected comprises using the position of the display image at the time of reception of the selection input.

10. The image display method according to claim 7, wherein receiving selection input is comprised of receiving repeated selection input from an external source in the position of a single display image and determining which one of the plurality of objects is selected comprises determining that the selected object is an object superimposed on the display image.

11. The image display method according to claim 7, further comprising superposing an image that visually indicates which one of the plurality of objects is the object determined to be selected on top of the display image.

12. The image display method according to claim 7, wherein the plurality of objects include a frame in which an image is placed and a layout image that is placed within the frame.

13. An executable computer program stored in a tangible computer readable medium for directing the image display within an image display apparatus, the computer program comprising:
   creating a display image that has a plurality of objects superposed on each other, such that first group of the plurality of objects is superposed on a second group of the plurality of objects;
   displaying the display image at a position within a display;
   receiving selection input from an external source, and based on the selection input, determining which one of the plurality of objects in the display image is selected and whether the selected object is in the first group of the plurality of objects which is superimposed on an object of the second group of the plurality of the second group of objects or whether the selected object is in the second group of the plurality of the objects; and placing a first index image at the position different from a position of the display image on the screen when the selection-and-judgment section determines that an object of the first group of objects is selected;

placing the second index image at the position different from the position of the display image when the selection-and-judgment section determines that a object of the first group of objects is selected;

wherein the image display section displays the first or second index image on the display in addition to the display image.

14. The computer program according to claim 13, further comprising displaying a Recycle Bin image visually indicating the deletion of the object at a position different from the position of the display image on the display, at a position near the index image.

15. The computer program according to claim 13, wherein determining which one of the plurality of objects is selected comprises using the position of the display image at the time of reception of the selection input.

16. The computer program according to claim 13, position of a single display image and determining which one of the plurality of objects is selected comprises determining that the selected object is an object superimposed on the display image.

17. The computer program according to claim 13, further comprising superposing an image that visually indicates which one of the plurality of objects is the object determined to be selected on top of the display image.

18. The computer program according to claim 13, wherein the plurality of objects include a frame in which an image is placed and a layout image that is placed within the frame.

* * * * *